Feb. 2, 1971  J. GRUBER  3,560,039
SANITATION DEVICE
Filed Dec. 6, 1968

INVENTOR.
Jack Gruber
BY Irving Seidman
ATTORNEY

United States Patent Office 3,560,039
Patented Feb. 2, 1971

3,560,039
SANITATION DEVICE
Jack Gruber, 280 Prospect Ave.,
Hackensack, N.J. 07601
Filed Dec. 6, 1968, Ser. No. 781,937
Int. Cl. A47j 45/10; B25b 7/00
U.S. Cl. 294—16         5 Claims

ABSTRACT OF THE DISCLOSURE

Apparatus for handling and disposing of animal excrement and the like comprising a pair of tongs having transverse elongated scoop portions connected to the end of each lever which curves concavely inwardly toward the opposite lever so that the scoop portions form a closed-end scoop when the tong is closed. Tissue retaining means mounted on the tongs to hold a packet of tissues for use in handling the excrement.

---

This invention relates generally to sanitary apparatus and, more particularly, pertains to apparatus for handling and disposing of excrement, particularly of animals.

The problem of sanitation with regard to animals very often arises even though the animal may be housebroken. For example, due to a disease or so-called accident an animal may deposit its excrement indiscriminately. Heretofor, various devices have been provided in the past for removing and disposing of such matter. However, these devices usually have severe drawbacks which make them unsuitable for their intended use.

To be more specific, implements have been provided for picking up excrement. However, it has been found that after relatively few uses, excrement is allowed to accumulate on certain portions of these devices so that a periodic cleaning is necessitated in order to maintain sanitary conditions. More often than not, these implements are thrown away rather than used continuously. Moreover, presently available devices for trapping and removing animal excrement are usually designed for either outdoor use or indoor use. That is, a device designed for indoor use usually cannot be used outdoors and, similarly a device designed for outdoor use cannot be used indoors. Thus, a person is required to purchase at least two separate and distinct devices to maintain sanitary conditions both indoors and outdoors. Moreover, devices of the type under consideration are usually of complex construction and require a degree of skill on the part of the user to manipulate the same.

Accordingly, it is an object of the present invention to provide an improved sanitary apparatus for handling and disposing of animal excrement.

Another object of the present invention resides in the novel details of construction which provide a sanitary apparatus of the type described which is simple to operate and which is relatively inexpensive.

Further object of the invention is to provide a sanitary apparatus for removing animal excrement wherein the excrement does not come into contact with the apparatus, thereby eliminating the need to continually clean the same.

Another object of the present invention is to provide a sanitary apparatus which is simple in construction and reliable in operation.

Accordingly, a sanitary apparatus constructed in accordance with the present invention includes a tong member including a pair of levers pivotally connected together intermediate their ends. Loop handle portions are provided at one end of each of said levers and the other end of each of said levers are provided with transverse elongated scoop portions which curve concavely inwardly toward the opposite lever so that said scoop portions form a closed-end scoop when the tong member is in the closed position. The tong member is adapted to be closed about the excrement whereby the excrement may easily be lifted and disposed of in the toilet or the like.

Other features and advantages of the present invention will become more apparent from a consideration of the following detailed description when taken in conjunction with the accompanying drawing, in which.

Figure 1:
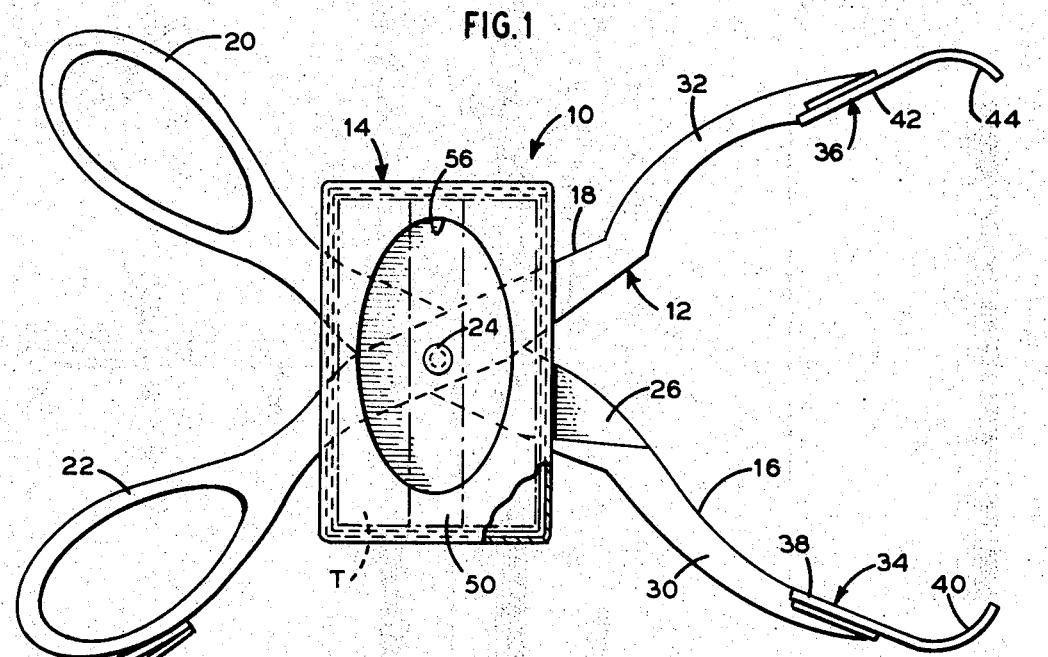
FIG. 1 is a top plan view of a sanitary apparatus constructed according to the present invention.
Figure 2:
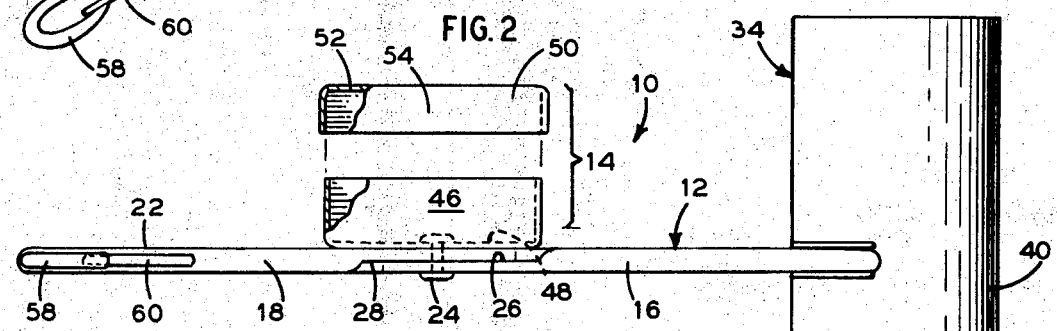
FIG. 2 is a side elevational view thereof.

The sanitary apparatus of the present invention is designated generally by the reference numeral 10 in the figures and includes a tong member 12 and a tissue-retaining device 14. More specifically, the tong member 12 includes a lever 16 and a lever 18. A loop handle 20 is provided at the end of the lever 16 and a loop handle 22 is similarly provided at the opposed end of the lever 18. The loop handle 22 is slightly larger than the loop handle 20 and is adapted to receive the first and index finger of the hand while the loop handle 20 is adapted to receive the thumb so that the tong member 12 may be operated in the manner indicated below. A pivot pin 24 connects the levers 16 and 18 approximately midway intermediate their ends to pivotally interconnect the levers. In practice, the pivot pin 24 comprises a rivet. The levers 16 and 18 are provided with respective complementary formed recesses 26 and 28 so that the mid-sections of the levers are superimposed on each other when the tong member 12 is in the closed position.

As shown clearly in FIG. 1, the bottom portions 30 and 32 of the respective levers 16 and 18 are slightly arcuate in shape. Connected to the ends of the respective levers 16 and 18 are scoop portions 34 and 36.

Figure 3:
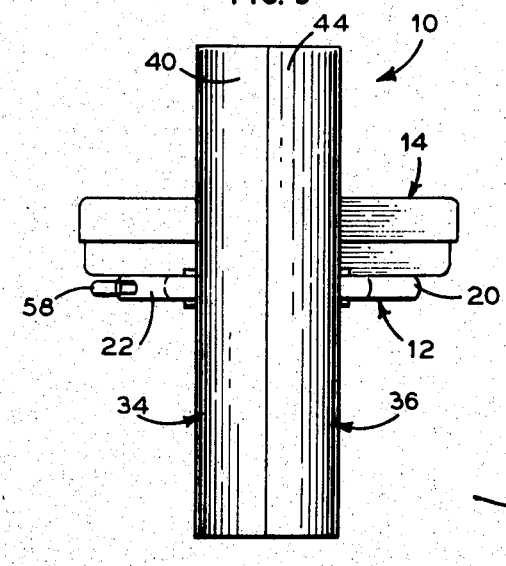
FIG. 3 is an end elevational view of the apparatus shown in FIG. 1.

The scoop portions 34 and 36 are transverse with respect to the plane of the levers 16 and 18. The scoop portion 34 includes an elongated substantially flat section 38 which is integral with a concave inwardly curved section 40 which curves toward the lever 18. Similarly, the scoop portion 36 includes a substantially flat elongated section 42 which is integral with a concave inwardly section 44 which curves toward the lever 16. The tong member 12 is adapted to be moved between an open position wherein the loop handles 20 and 22 are separated from each other so that the scoop portion 34 is spaced from the scoop portion 36, as shown in FIG. 1, in a closed position wherein the curved section 40 of the scoop portion 34 engages the edge of the curved section 44 of the scoop portion 36 to form a closed-end scoop, as shown in FIG. 3.

The tissue-retaining device 14 includes a lower receptacle 46 having an open top. The receptacle 46 is substantially oblong in shape and includes a bottom wall 48 which is connected to the tong member 12 by the rivet 24. That is, the rivet 24 extends through the levers 16 and 18 to pivotally interconnect the same and through the bottom wall 48 of the lower receptacle 46 to connect the receptacle with the tong member. A cover 50 having a top wall 52 and depending peripheral wall 54 is adapted to close the open top of the lower receptacle 46. The cover 50 is sized to fit on the lower receptacle 46 in relatively tight sliding fit so that it can easily be removed but will be maintained in position when it is placed on the receptacle 46. Provided in the cover 50 is an elliptical opening 56. The receptacle 46 is adapted to receive a package of tissues T therein which may be removed singly through the opening 56.

Hook 58 is provided which is connected to the loop handle 22, as shown in FIG. 1. The hook is closed by a spring hasp 60 which may be moved rearwardly to open the hook portion 58. The hook portion 58 is provided so that the sanitary apparatus 10 of the present invention easily may be connected to a leash of an animal to facilitate carrying the apparatus.

In practice, the apparatus 10 is fabricated from a substantially lightweight plastic which can be cleaned easily.

In use, the cover 50 is removed and a package of tissues T are inserted into the lower receptacle 56. The cover 50 is then replaced so that the tissues are retained in the tissue-retaining device 14. When it is desired to remove or otherwise dispose of animal excrement, a tissue is removed from the tissue-retaining device 14 and is draped over the excrement. Thereafter, the tong member 12 is operated to the open position, as shown in FIG. 1, and the scoop portions 34 and 36 are positioned on either side of the excrement. The tong member 12 is then closed in the conventional manner whereby the curved sections 40 and 44 of the scoop portions 34 and 36 move toward each other. As the scoop portions move toward each other, the edges of the respective portions engage the tissue and exert an upward biasing force on the excrement thereby allowing the sections 40 and 44 to pass thereunder. Continued movement of the tong member 12 to the closed position causes the respective scoop portions to meet thereby forming the closed-end scoop. The tong member is then lifted to carry the excrement to a place where it can be disposed of such as a toilet or the like. More specifically, when the excrement is to be disposed of the tong member is operated to the open position whereby the excrement which is now covered by the tissue falls therefrom. The apparatus 10 may then be connected to the leash via the hook 58 and hasp 60. It is to be noted that since the tissue covers the excrement, the excrement will not come into contact with the tong member 12 thereby eliminating the need to continuously clean the tong member.

Accordingly, the sanitary apparatus has been provided for handling and disposing of animal excrement which is simple in construction and operation and relatively inexpensive to fabricate.

While a preferred embodiment of the invention has been shown and described herein it will become obvious that numerous omissions, changes and additions may be made in such embodiment without departing from the spirit and scope of the present invention.

What is claimed is:

1. Apparatus for handling and disposing of animal excrement and the like comprising in combination a tong member including a pair of levers pivotally connected together intermediate their ends, loop handle portions at one end of each of said levers, the other end of each of said levers having a transverse elongated scoop portion which curves concavely inwardly toward the opposite lever whereby said scoop portions form a closed-end scoop when said tong member is in the closed position, and tissue-retaining means on said tong member for retaining a package of tissues therein, said tissue retaining means including a receptacle connected to one of said pair of levers and removable cover on said receptacle having an opening therein for the removal of tissues from said receptacle.

2. Apparatus as in claim 1, in which said receptacle includes a bottom wall, and a pivot pin pivotally interconnecting said levers and extending through said bottom wall to connect said receptacle with said tong member.

3. Apparatus as in claim 1, in which said tong member and said tissue-retaining means is fabricated from a plastic material.

4. Apparatus as in claim 1, and a hook connected to one of said loop handle portions for connecting said apparatus to a leash and the like.

5. Apparatus as in claim 1, and complementary formed recesses in said levers positioned to be superimposed on each other when said tong member is in the closed position.

References Cited

UNITED STATES PATENTS

| | | | |
|---|---|---|---|
| 1,566,394 | 12/1925 | Gilder | 294—8.5 |
| 1,608,498 | 11/1926 | Fisher | 294—118 |
| 2,104,029 | 1/1938 | Eshman | 128—326 |
| 2,950,939 | 8/1960 | Van Volkenburgh | 294—106X |

FOREIGN PATENTS

| | | | |
|---|---|---|---|
| 466,011 | 2/1914 | France | 294—118 |

EVON C. BLUNK, Primary Examiner

R. S. GAITHER, Assistant Examiner

U.S. Cl. X.R.

206—57; 294—28, 118